Feb. 26, 1957 — W. S. KUNZLER — 2,783,332
THERMAL TIMING APPARATUS
Filed May 19, 1955

INVENTOR.
WILLIAM S. KUNZLER.
BY
HIS ATTORNEY.

United States Patent Office 2,783,332
Patented Feb. 26, 1957

2,783,332

THERMAL TIMING APPARATUS

William S. Kunzler, Greensburg, Pa., assignor to Robertshaw-Fulton Controls Company, Greensburg, Pa., a corporation of Delaware Application May 19, 1955, Serial No. 509,651

12 Claims. (Cl. 200—122)

This invention relates to thermal timing apparatus and more particularly to thermal time delay switches.

In devices of this character, it is customary to provide an electric heating element in heating relation to a thermally responsive switch means. The thermally responsive switch means is heated by convection currents from the heating element and will move to an open position after a predetermined time delay. The energization of the heating element may be controlled by the thermally responsive switch means to cause cycling of the switch between open and closed positions or may be energized independently to cause only a time delay.

It is well known in the art that variations in the voltage applied to the heating element will cause variations in the heating rate of the element and the rate of flow of convection currents to the thermally responsive switch means. Since the heating rate of the switch means depends upon the rate of flow of convection currents from the heating element, the time delay of the switch means will also vary with voltage of the heating element. Therefore, it is an object of this invention to maintain a constant time delay with variations in voltage of the heating element.

Another object of this invention is to produce an improved time delay relay that is not appreciably affected by ambient temperature variations.

Another object of this invention is to produce an improved thermally responsive time delay that is compact in form and simple in design.

In the preferred embodiment of the invention, a thermally responsive switch means is positioned to be heated by an electric heating element. A baffle plate is positioned between the heating element and the switch means to control the flow of convection currents from the heating element to the switch means. A bi-metal strip is operatively connected to the baffle plate and positioned to be heated by the heating element to cause movement of the baffle plate in response to heating of the element.

Other objects and advantages will become apparent from the following description taken in connection with the accompanying drawings, wherein.

Figure 1:
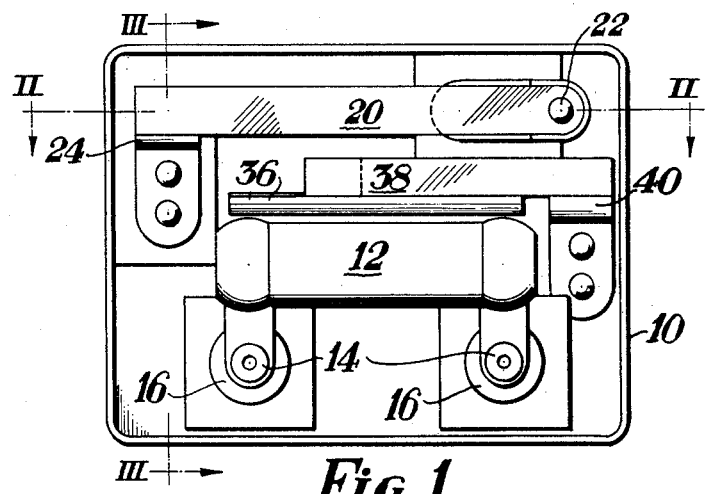
Fig. 1 is a front view of a time delay switch embodying this invention.
Figure 2:
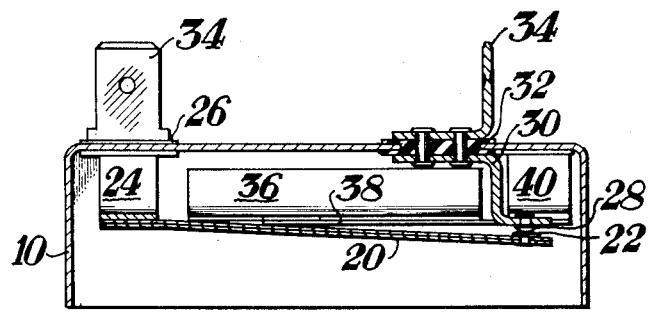
Fig. 2 is a section taken on the line II—II of Fig. 1.
Figure 3:
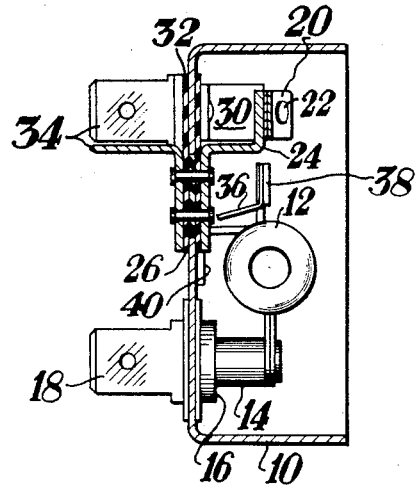
Fig. 3 is a section taken on the line III—III of Fig. 1.

Referring more particularly to the drawing, the device shown therein comprises a housing 10 which serves as a protective cover and mounting surface for the elements to be described. A heating element comprising a standard resistor 12 is mounted within the housing 10 and supported by two stand off rivets 14, 14 which are respectively insulated from the housing 10 by two insulating washers 16, 16. Each of the rivets 14, 14 has attached thereto a lug 18 to provide means for connecting the resistor 12 to an electric circuit which will be later described.

Thermally responsive switch means comprising a bimetal switch arm 20 carrying a contact 22 on one end thereof has the other end attached to a support 24 which is insulated from the housing 10 by an insulating washer 26. The bi-metal switch arm 20 is positioned with its longitudinal axis substantially parallel to the longitudinal axis of the resistor 12 to have a substantial portion of its length exposed to convection currents which will flow from the resistor 12 when heated. The contact 22 is biased by the inherent bias of the bi-metal arm 20 into engagement with a contact 28 fixed to a support 30 which is insulated from the housing 10 by an insulating washer 32. The supports 30, 24 each have attached thereto a terminal 34 which enables the contacts 22, 28 to be connected to an electric circuit later to be described.

It can now be seen that upon energization of the resistor 12, convection currents will flow therefrom to heat the bi-metal switch arm 20. After a time delay the arm 20 will be heated sufficiently to flex to a new position thereby opening the contacts 22, 28. The operation of thermally responsive switches of this nature is well known in the art and further description is deemed unnecessary.

It is to be noted that the time delay between energization of the resistor 12 and the opening of the contacts 22, 28 will depend upon the voltage applied to the resistor 12 as hereinbefore described. When the voltage applied to the resistor 12 varies, the flow rate of the convection currents to the arm 20 will also vary to alter the time delay. To compensate for this undesirable condition, a rectangular baffle plate 36 is positioned between the resistor 12 and arm 20 with its longitudinal axis substantially parallel to the longitudinal axis of the resistor 12. A bi-metal strip 38 has one end attached to the housing 10 by a support 40 and the other end thereof attached to the baffle plate 36 to support the latter. The bi-metal strip 38 is subject to the heat of the resistor 12 and is operative when heated to move the baffle plate 36 over the resistor 12. The baffle when positioned over the resistor 12 deflects a substantial portion of the convection currents flowing to the switch arm 20, thus reducing the heating rate of the switch arm 20.

*Operation*

Upon energization of the resistor 12 by normal voltage, heating thereof will occur at a constant rate. The bi-metal strip 38 will be heated by the flow of convection currents from the resistor 12 to cause movement of the baffle plate 36 at a constant rate to partially deflect a portion of the convection currents flowing to the bi-metal switch arm 20. After a time delay, the switch arm 20 will be heated sufficiently to cause opening of the contacts 22, 28.

Assuming now that the voltage applied to the resistor 12 is higher than the normal value, it can be seen that the resistor 12 will be heated at an increased rate resulting in an increased flow rate of convection currents therefrom. This heats the bi-metal strip 38 at an increased rate and causes movement of the baffle plate 36 to its deflecting position in a shorter time. Due to the increased voltage, the strip 38 will reach a higher temperature than obtained with normal voltage to also cause a greater deflection of convection currents than obtained with the normal voltage. Thus, the baffle 36 is responsive to the increased flow rate of convection currents from the resistor 12 to maintain a substantially constant flow rate of convection currents to the switch arm 18 and maintain a substantially constant time delay.

It can be seen that if a decrease in voltage occurs, the reverse of the above-described effect on the baffle 36 will occur. Since in this case the bi-metal strip 34 will be heated at a slower rate, an increased flow of convection currents to the switch arm 18 will be permitted by the baffle 33 to maintain the time delay constant as before.

It will be obvious to those skilled in the art, that the energization of the resistor 12 may be controlled by the contacts 22, 28 to obtain a cycling time delay switch or may be controlled independently to obtain a single time delay switch.

It will also be obvious to those skilled in the art that the illustrated embodiment may be variously changed and modified or features thereof, single or collectively embodied in other combinations than those illustrated without departing from the scope of the invention or sacrificing all the advantages thereof, and that accordingly the disclosure herein is illustrative only and the invention is not limited thereto.

I claim:

1. In a thermostatic control device, the combination comprising switch means movable between controlling positions for controlling the flow of electric energy, said switch means including an element responsive to the heating effect of the flow of electric energy in one position of said switch means for causing movement thereof to another position, and a second element responsive to variations in the heating effect of said energy for movement into and out of shielding relation with the first said element for substantially eliminating the effect of said variations on the first said element.

2. In a thermostatic control device, the combination comprising switch means movable between controlling positions for controlling the flow of electric energy, an element to be heated by the flow of electric energy, said switch means including a member responsive to the heating of said element for moving said switch means from one position to another, and a second member responsive to variations in the temperature of said element for movement into and out of shielding relation therewith for substantially eliminating the effect of said temperature variations on said first named means.

3. In a thermal time delay switch, the combination comprising normally closed thermally responsive contact means, electric heating means operatively associated with said contact means to cause opening thereof after a time delay of a predetermined period, and an element responsive to an increase in the heating rate of said heating means for movement into shielding relation therewith for substantially eliminating the effect of said increase and maintaining said predetermined time delay.

4. In a thermostatic control device, the combination comprising switch means movable between controlling positions for controlling the flow of electric energy, thermally responsive means operably associated with said switch means for causing movement thereof between said positions in response to an increase in temperature of said thermally responsive means, electric heating means positioned in heating relation to said thermally responsive means, and means operably associated with said heating means and including an element responsive to an increase in the heating rate of said heating means for movement into shielding relation therewith for substantially eliminating effects caused by said increased heating rate of said heating means.

5. In a thermostatic control device, the combination comprising contact means for controlling the flow of electric energy, thermally responsive means operably associated with said contact means for causing opening thereof at a predetermined temperature, an element connected to be heated by the flow of electric energy for heating said thermally responsive means to said predetermined temperature, and means operably associated with said element and including a baffle member responsive to the heating rate of said element for movement relative thereto, said member and element being cooperable for maintaining a substantially constant heating rate of said thermally responsive means during variations in the heating rate of said element.

6. In a thermal time delay switch, the combination comprising switch means biased toward a closed position for controlling the flow of electricity, first thermally responsive means operatively connected to said switch means and operative when heated to cause movement of said switch means to an open position after a predetermined time delay, electric heating means positioned in heating relationship to said first thermally responsive means, baffle means disposed between said heating means and said first thermally responsive means for controlling the flow of convection currents from said heating means to said thermally responsive means, and second thermally responsive means positioned to be heated by said heating means and operatively connected to said baffle means, said second thermally responsive means being responsive to variations in the heating rate of said first heating means to vary the position of said baffle means thereby maintaining a substantially constant flow of convection currents to said first thermally responsive means.

7. A thermal time delay switch as claimed in claim 6 wherein said heating means comprises a resistor adapted for connection to an electric circuit.

8. A thermal time delay switch as claimed in claim 6 wherein said first thermally responsive means comprises a bi-metal strip operatively connected to said switch means.

9. A thermal time delay switch as claimed in claim 6 wherein said baffle means comprises a rectangular shaped plate and said second thermally responsive means comprises a bi-metal strip adapted to control the position of said plate.

10. In a thermostatic control device, the combination comprising an electric heater, a control device includnig a member positioned to be thermally responsive to the heat generated by said heater when energized by a source of electric energy, means positioned between said heater and said member for directing convection currents generated by said heater to said member, and means including an element responsive to the heat generated by said heater for controlling the position of said first named means whereby the flow rate of convection currents from said heater to said member will be substantially constant during variations in the voltage of the source energizing said heater.

11. A thermostatic control device as claimed in claim 10 wherein said first named means comprise a baffle plate.

12. A thermostatic control device as claimed in claim 10 wherein said element comprises a bi-metal strip.

References Cited in the file of this patent

UNITED STATES PATENTS

| | | |
|---|---|---|
| 2,035,426 | Field | Mar. 24, 1936 |
| 2,303,153 | Woodworth | Nov. 24, 1942 |
| 2,371,018 | Ashworth et al. | Mar. 6, 1945 |
| 2,611,056 | Jackel | Sept. 12, 1952 |
| 2,611,855 | Turner | Sept. 23, 1952 |